（12）United States Patent
Lee et al.

(10) Patent No.: US 11,586,245 B2
(45) Date of Patent: Feb. 21, 2023

(54) ELECTRONIC DEVICE INCLUDING ELECTROMAGNETIC SENSOR MODULE AND CONTROL METHOD THEREOF

(71) Applicant: Samsung Electronics Co., Ltd, Suwon-si (KR)

(72) Inventors: Youngbae Lee, Suwon-si (KR); Seungwoo Lee, Suwon-si (KR); Seungjae Lee, Suwon-si (KR); Jinchul Choi, Suwon-si (KR); Seungnyun Kim, Suwon-si (KR); Yongsang Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 296 days.

(21) Appl. No.: 16/566,636

(22) Filed: Sep. 10, 2019

(65) Prior Publication Data
US 2020/0081484 A1 Mar. 12, 2020

(30) Foreign Application Priority Data
Sep. 10, 2018 (KR) .................. 10-2018-0107747

(51) Int. Cl.
*G06F 1/16* (2006.01)
*G06F 17/14* (2006.01)
*G06F 3/046* (2006.01)
*H01Q 5/40* (2015.01)

(52) U.S. Cl.
CPC .............. *G06F 1/163* (2013.01); *G06F 3/046* (2013.01); *G06F 17/142* (2013.01); *H01Q 5/40* (2015.01)

(58) Field of Classification Search
CPC ........ G06F 1/163; G06F 3/046; G06F 17/142; H01Q 5/40
See application file for complete search history.

(56) References Cited

U.S. PATENT DOCUMENTS 7,362,836 B2    4/2008 Nygaard, Jr.
2009/0306920 A1*  12/2009 Zwinger ............ G01R 31/2884
                                                                  702/77

(Continued)

FOREIGN PATENT DOCUMENTS

JP        2006-308584 A     11/2006
KR        10-1026080 B1      3/2011

(Continued)

OTHER PUBLICATIONS

International Search Report dated Dec. 19, 2019 in connection with International Patent Application No. PCT/KR2019/011592, 3 pages.

(Continued)

*Primary Examiner* — Mark Edwards
*Assistant Examiner* — Chayce R Bibbee

(57) ABSTRACT

An electronic device including an EM sensor module and a method for controlling the electronic device. An electronic device includes an electromagnetic (EM) sensor module, an antenna module electrically connected to the EM sensor module, a memory operationally connected to the EM sensor module, and a processor operationally connected to the EM sensor module, The EM sensor module is configured to detect an electromagnetic signal around the electronic device using the antenna module, determine whether the electromagnetic signal is a valid signal from at least one external electronic device, and send electromagnetic detection data related to all or at least part of the electromagnetic signal to the processor based on the electromagnetic signal being a valid signal.

17 Claims, 18 Drawing Sheets

(56) References Cited

U.S. PATENT DOCUMENTS

| | | | |
|---|---|---|---|
| 2013/0073876 A1 | 3/2013 | Cong | |
| 2014/0075226 A1* | 3/2014 | Heo | G06F 3/167 713/323 |
| 2016/0259432 A1* | 9/2016 | Bau | G06F 3/04182 |
| 2016/0261268 A1 | 9/2016 | Rakova et al. | |
| 2018/0219428 A1 | 8/2018 | Bae | |

FOREIGN PATENT DOCUMENTS

| | | |
|---|---|---|
| KR | 10-2011-0038447 A | 4/2011 |
| KR | 10-2014-0087526 A | 7/2014 |
| WO | 2009044368 A2 | 4/2009 |

OTHER PUBLICATIONS

Written Opinion of the International Searching Authority dated Dec. 19, 2019 in connection with International Patent Application No. PCT/KR2019/011592, 5 pages.

Supplementary European Search Report dated Jul. 23, 2021 in connection with European Application No. 19860391.2, 8 pages.

Demirkol, et al., "Wake-Up Receivers for Wireless Sensor Networks: Benefits and Challenges," IEEE Wireless Communications, vol. 16, No. 4, Aug. 1, 2009, 9 pages.

Mondal, et al., "Energy-efficient Transceiver for Wireless NoC," 2017 30th International Conference on VLSI Design and 2017 16th International Conference on Embedded Systems (VLSID), IEEE, Jan. 7, 2017, 6 pages.

* cited by examiner

ELECTRONIC DEVICE INCLUDING ELECTROMAGNETIC SENSOR MODULE AND CONTROL METHOD THEREOF

CROSS-REFERENCE TO RELATED APPLICATION

This application is based on and claims priority under 35 U.S.C. § 119 to Korean Patent Application No. 10-2018-0107747 filed on Sep. 10, 2018 in the Korean Intellectual Property Office, the disclosure of which is incorporated by reference herein in its entirety.

BACKGROUND

1. Field

Various embodiments relate to an electronic device including an electromagnetic (EM) sensor module and control method thereof.

2. Description of Related Art

Nowadays, various kinds of electronic devices are popular, and they include a smartphone, a tablet personal computer (PC), a portable media multimedia player (PMP), a personal digital assistant (PDA), a laptop PC, a wearable device (e.g., wristwatch), and a head-mounted display (HMD).

Such electronic devices are typically equipped with a communication circuit and antenna to communicate with a remotely located external device or to establish a short range communication network (e.g., Wi-Fi, Bluetooth, Infrared, and Zigbee network) for communication with closely located external devices.

In order to establish a connection with a closely located external device, the electronic device should carry out a complex procedure of activating a connectivity function, searching around for nearby external devices, and selecting and connecting one of the found devices.

In this regard, techniques for identifying an external device using a unique electromagnetic signal (e.g., information, waveform, and frequency) emitted from the external device are emerging as alternative methods.

In the case of using these methods, however, the electronic device is likely to continue the search even in an environment where there is no available external electronic device, which requires processing noise signals caused by environmental noise (or ambient noise) and consumes resources unnecessarily. Such a gainless device-search operation in an environment where there is no nearby external device is likely to cause waste of electric current.

SUMMARY

Various embodiments disclose a method and apparatus for protecting an electronic device including an electromagnetic (EM) sensor module against unnecessary system resource occupancy and electric current consumption by filtering out invalid electromagnetic detection data caused by noise signals.

Various embodiments disclose a method and apparatus for improving entire system efficiency in association with system resources and electric current consumptions in such a way that an electronic device including an EM sensor module performs post-processing (or analysis) only on valid data.

According to an embodiment of the disclosure, an electronic device includes an electromagnetic (EM) sensor module, an antenna module electrically connected to the EM sensor module, a memory operationally connected to the EM sensor module, and a processor operationally connected to the EM sensor module; the EM sensor module is configured to detect an electromagnetic signal around the electronic device using the antenna module, determine whether the electromagnetic signal is a valid signal from at least one external electronic device, and send electromagnetic detection data related to all or at least part of the electromagnetic signal to the processor based on the electromagnetic signal being a valid signal.

According to an embodiment of the disclosure, a method for controlling an electronic device including an electromagnetic (EM) sensor module includes detecting an electromagnetic signal around the electronic device using an antenna module, determining whether the electromagnetic signal is a valid signal from at least one external electronic device, and sending electromagnetic detection data related to all or at least part of the electromagnetic signal to a processor based on the electromagnetic signal being a valid signal.

According to an embodiment of the disclosure, an electronic device includes an electromagnetic (EM) sensor module, an antenna module electrically connected to the EM sensor module, a memory operationally connected to the EM sensor module, and a processor operationally connected to the EM sensor module; wherein the EM sensor module is configured to detect an electromagnetic signal around the electronic device using the antenna module, determine whether the electromagnetic signal is a valid signal from at least one external electronic device, and, based on the electromagnetic signal being a valid signal, transmit electromagnetic detection data related to all or at least part of the electromagnetic signal to a server, receive an identification result on the electromagnetic signal from the server, and provide the processor with the identification result on the electromagnetic signal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 12D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
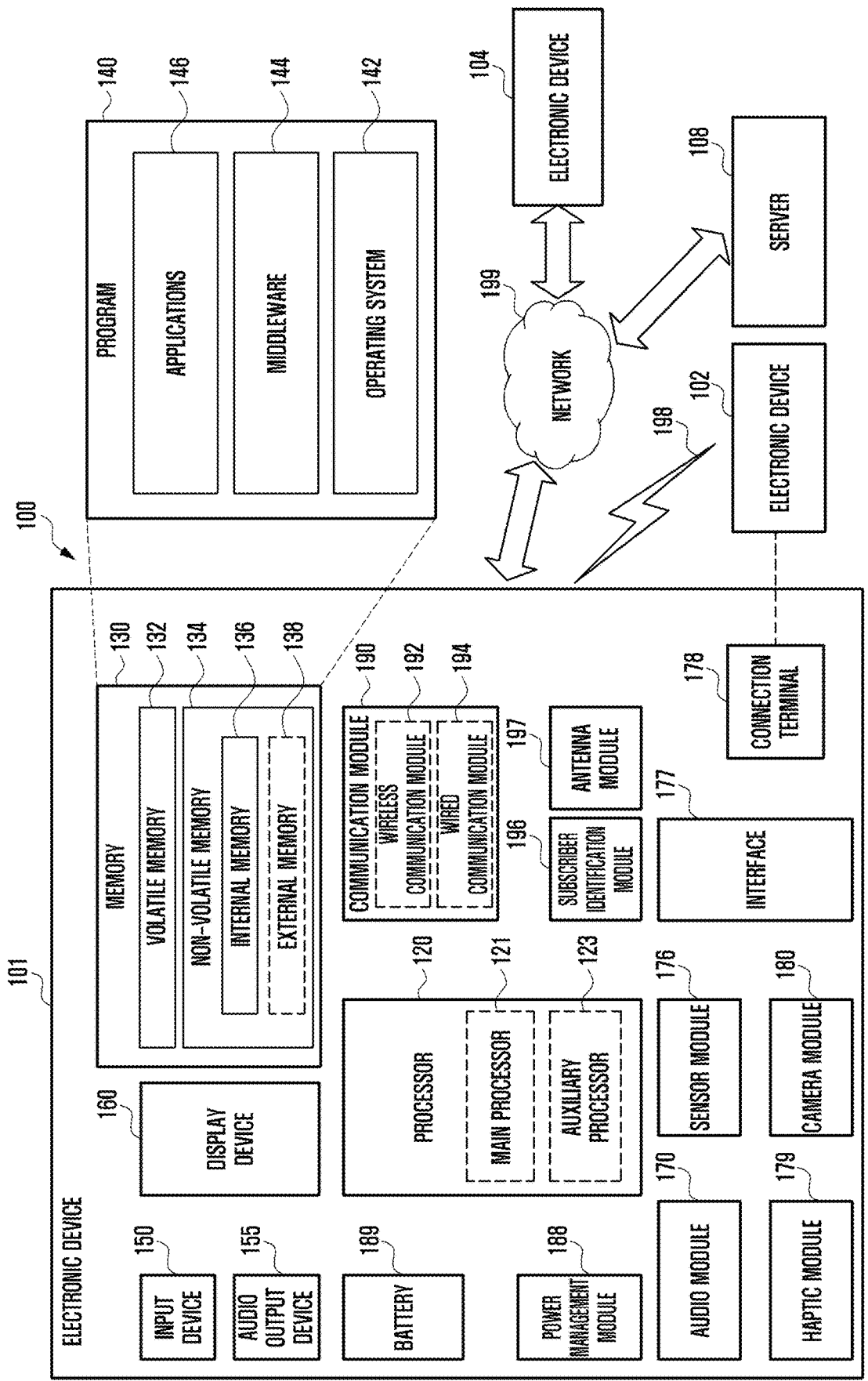
FIG. 1 illustrates a block diagram of an electronic device in a network environment according to various embodiments.

FIG. 1 illustrates a block diagram of an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other components (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
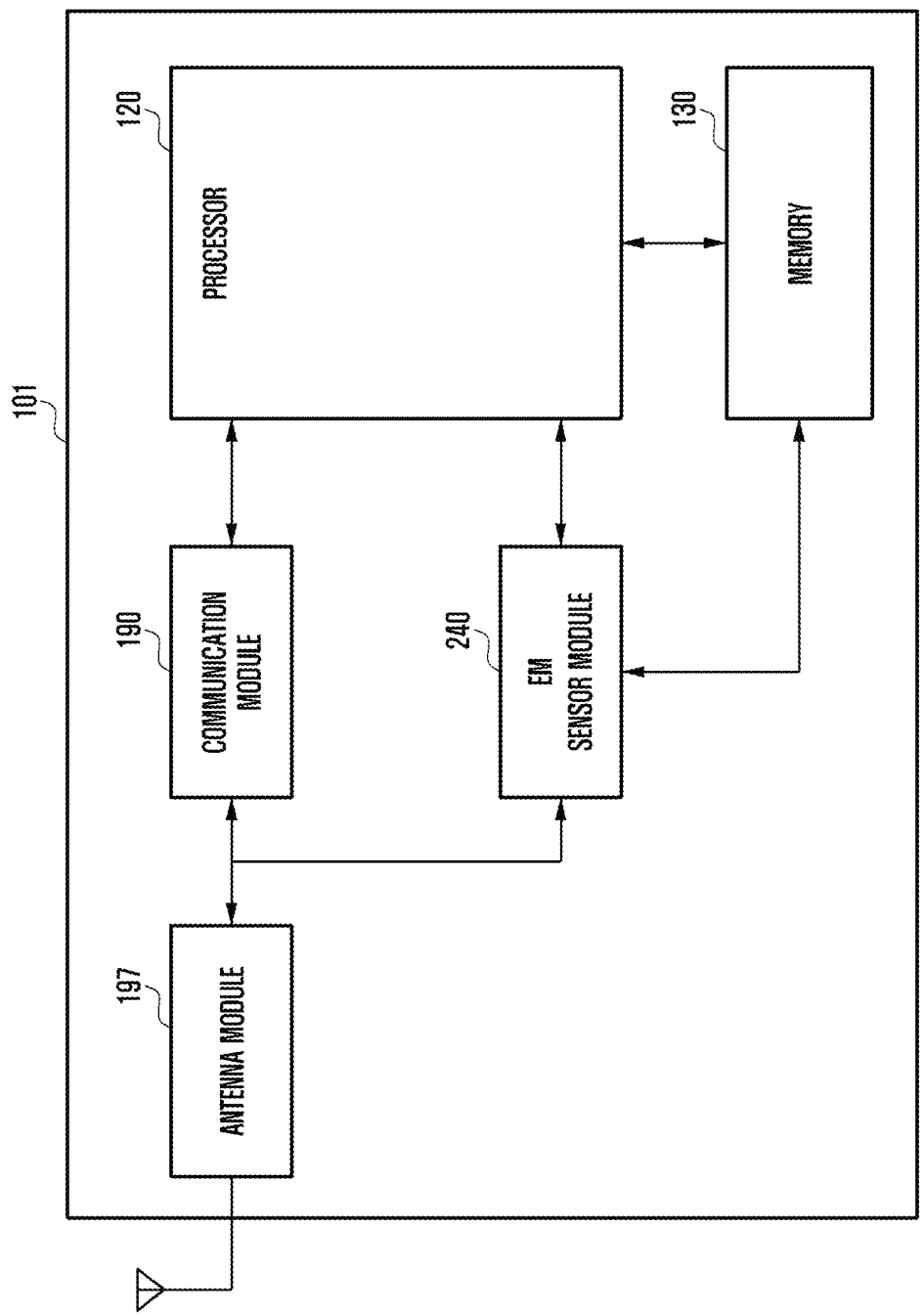
FIG. 2A illustrates a block diagram of a configuration of an electronic device according to various embodiments.

FIG. 2A illustrates a block diagram of a configuration of an electronic device 101 according to various embodiments.

In reference to FIG. 2A, the electronic device 101 may include a processor 120, a communication module 190, an antenna module 197, an EM sensor module 240 (e.g., sensor module 176 in FIG. 1), and a memory 130. According to an embodiment, the electronic device 101 may be configured with omission of at least one of the aforementioned components or addition of one or more other components.

According to various embodiments, the communication module 190 may be configured to establish a wireline or wireless communication channel between the electronic device 101 and an external electronic device (e.g., electronic device 102, electronic device 104, or server 108 in FIG. 1) and perform communication over the established communication channel using the antenna module 197.

According to various embodiments, the antenna module 197 may be configured to detect an electromagnetic signal in a predetermined frequency band. The antenna module 197 may include an antenna dedicated for detection of the electromagnetic signal and it may be mounted on at least part of an interior and/or an exterior (surface) of the electronic device 101. Without being limited thereto, a communication antenna may be used along with and for electromagnetic signal detection.

According to various embodiments, the EM sensor module 240 may detect a unique signal (or unique electromagnetic signal) corresponding to an electromagnetic interference created by an external electronic device. The EM sensor module 240 may detect a unique signal of an external electronic device (e.g., electronic device 102 in FIG. 1) by means of the antenna module 197 and provide the detected unique signal (or information) to the processor 120. According to an embodiment, the EM sensor module 240 may be implemented as a chip separated from the communication module 190 or as at least part of the communication module 190. According to an embodiment, the EM sensor module 240 may be connected to the processor 120 and configured to receive an electromagnetic signal from an external electronic device and send the received electromagnetic signal to the processor 120. According to various embodiments, the EM sensor module 240 may be configured to analyze the electromagnetic signal received from the external electronic device, generate data related to the electromagnetic signal, and send the generated data to the processor 120.

According to various embodiments, the EM sensor module 240 may determine whether the electromagnetic signal fulfils a predetermined condition and, if so, send a wakeup signal to the processor 120 to awake the processor 120. For example, while the processor 120 is operating in a deactivated mode (e.g., sleep mode), the EM sensor module 240 may receive an electromagnetic signal by means of the antenna module 197, determine whether the electromagnetic signal is stronger by or over a predetermined amount or has a frequency characteristic in a predetermined range, and send a wakeup signal to the processor as a result of the determination.

According to various embodiments, the memory 130 may be configured to perform machine learning on the unique electromagnetic signal of the external electronic device and store related information in the form of a table. According to an embodiment, the memory 130 may reproduce per-unique signal values for quick access by a corresponding program (or software or application) and store the values in the form of a lookup table. For example, the memory may store a lookup table mapping device types to waveforms.

According to various embodiments, the processor 120 may control the EM sensor module 240 to detect the unique electromagnetic signal emitted by the external electronic device. According to an embodiment, the processor 120 may control the electronic device 101 to enter a connectable state or transition to a connected state upon identifying the external electronic device, establish a connection with the external electronic device, and remotely control the external electronic device.

According to various embodiments, the processor 120 may compare unique signal information (or the unique electromagnetic signal) of the external electronic device that is received from the EM sensor module 240 with information stored in a signal table (e.g., lookup table). According to an embodiment, the processor 120 may display information on the external electronic device identified based on the result of the comparison on a display (e.g., display device 160 in FIG. 1). According to an embodiment, the processor 120 may automatically execute a predetermined function based on the information on the identified external electronic device. According to an embodiment, the processor 120 may activate connectivity with the external electronic device by means of a radio communication module (e.g., short range wireless communication module) and transition the external electronic device to a controllable state. According to an embodiment, the processor 120 may execute at least one predetermined application based on the information on the identified external electronic device.

According to various embodiments, the processor 120 may filter out the noise produced inside the electronic device 101. For example, in order to minimize input errors, the processor 120 may detect an in-device noise produced by a touch input made on a touchscreen and apply a compensation algorithm to an acquired signal (e.g., electromagnetic signal). According to an alternative embodiment, the processor 120 may detect a distortion waveform per a hand-held behavior type and apply the compensation algorithm to the acquired signal according to the hand-held behavior type.

According to various embodiments, the processor 120 may compare and collect measured electromagnetic signal values of the external electronic device and stored unique signal information to update the information continuously. According to an embodiment, the collected information may be analyzed through big data analysis for use in compensating the electromagnetic signal or unique signal information. The big data analysis may include a regression analysis technique, a clustering analysis technique, and an association analysis technique.

Figure 2B:
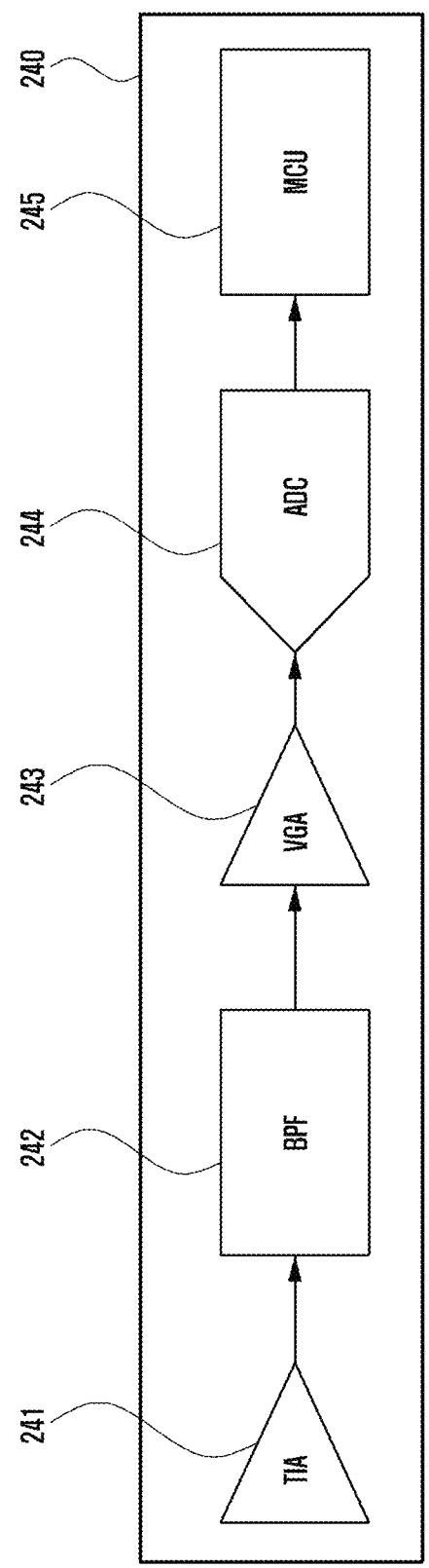
FIG. 2B illustrates a block diagram of a configuration of an EM sensor module according to various embodiments.

FIG. 2B illustrates a block diagram of a configuration of the EM sensor module 240 of FIG. 2A.

In reference to FIG. 2B, the EM sensor module 240 may include a trans-impedance amplifier (TIA) 241, a band pass filter (BPF) 242, a variable gain amplifier (VGA) 243, an analog-digital converter (ADC) 244, and a micro controller unit (MCU) 245. According to an embodiment, the EM sensor module 240 may be configured with omission of at least one of the aforementioned components or addition of one or more other components.

According to various embodiments, the TIA 241 may amplify a predetermined frequency band (e.g., about 1 kHz~about 2 MHz) of an electromagnetic signal received by the antenna module 230. According to an embodiment, the BPF 242 may filter the amplified signal to produce a certain desired signal (e.g., the certain desired signal defining a characteristic) defining a characteristic pattern. According to an embodiment, the VGA 243 may output a signal covering a predetermined gain range at a predetermined level in order to improve a noise characteristic of the filtered signal and an external interference signal removal characteristic. According to an embodiment, the ADC 244 may convert an analog signal output from the VGA 243 to a digital signal, which is output to the MCU 245.

According to various embodiments, the MCU 245 analyzes the digital signal and checks for a validity of the electromagnetic signal received from the antenna module 230. The MCU 245 may be configured to send the digital signal to the processor 120 after checking for the validity of the electromagnetic signal. The processor 120 may compare the digital signal with signals saved in a signal table stored in the electronic device 101 to identify an external electronic device. According to an embodiment, the MCU 245 may identify an external electronic device through such a signal comparison. In this case, the MCU 245 may send information on the identified external electronic device to the processor 120.

According to various embodiments, the components of the EM sensor module 240 may be arranged in a different order or changed in configuration. For example, the EM sensor module 240 may not only operate as an independent sensor or module but also be implemented as an external module and/or system circuit block in whole or in part.

According to various embodiments of the disclosure, the electronic device 101 may include the EM sensor module 240, the antenna module 197 that is electrically connected to the EM sensor module 240, the memory 130 that is operationally connected to the EM sensor module 240, and the processor 120 that is operationally connected to the EM sensor module; the EM sensor module 240 may be configured to detect an electromagnetic signal around the electronic device by means of the antenna module 197, determine whether the electromagnetic signal is a valid signal transmitted by at least one external electronic device, and send, if the electromagnetic signal is a valid signal, electromagnetic detection data related to all or at least part of the electromagnetic signal to the processor 120.

According to various embodiments of the disclosure, the electromagnetic detection data of the electronic device 101 may be time domain data generated by processing the electromagnetic signal or frequency domain data acquired by performing Fast Fourier Transform (FFT) on the time domain data.

According to various embodiments of the disclosure, the EM sensor module 240 of the electronic device 101 may be configured to send, if the electromagnetic signal is a valid signal, a wakeup signal for awaking the processor 120 along with the electromagnetic detection data.

According to various embodiments of the disclosure, the EM sensor module 240 of the electronic device 101 may be configured to acquire normalized data by applying a predetermined normalization function to the electromagnetic detection data, compare the normalized data with a predetermined threshold value, and determine whether the electromagnetic signal is a valid signal transmitted by at least one external electronic device based on a result of the comparison.

According to various embodiments of the disclosure, the EM sensor module 240 of the electronic device 101 may be configured to determine that the electromagnetic signal is a valid signal based on the normalized data being greater than the predetermined threshold value.

According to various embodiments of the disclosure, the EM sensor module 240 of the electronic device 101 may be configured to acquire at least two normalized data by applying at least two predetermined normalization functions to the electromagnetic detection data, compare the at least two normalized data with corresponding threshold values, and determine whether the electromagnetic signal is a valid signal transmitted by at least one external electronic device based on a result of the comparison.

According to various embodiments of the disclosure, the predetermined threshold value may define a boundary line for an ambient group.

According to various embodiments of the disclosure, the EM sensor module 240 of the electronic device 101 may be configured to divide the electromagnetic detection data by a predetermined unit of frequency interval, compare each segment of the divided electromagnetic detection data with each corresponding threshold value, and determine whether the electromagnetic signal is a value signal transmitted by at least one electronic device based on a result of the comparison.

According to various embodiments of the disclosure, the EM sensor module 240 of the electronic device 101 may be configured to determine that the electromagnetic signal is a valid signal based on at least one of the divided electromagnetic detection data being greater than a corresponding threshold value.

According to various embodiments of the disclosure, the electronic device 101 may be configured to activate the EM sensor module 240 based on a state of the electronic device or a predetermined condition related to the electronic device.

According to various embodiments of the disclosure, the electronic device 101 may include the EM sensor module 240, the antenna module 197 that is electrically connected to the EM sensor module, a memory 130 that is operationally connected to the EM sensor module 240, and the processor 120 that is operationally connected to the EM sensor module; the EM sensor module 240 may be configured to detect an electromagnetic signal around the electronic device by means of the antenna module 197, determine whether the electromagnetic signal is a valid signal transmitted by an external electronic device, transmit electromagnetic data related to all or at least part of the electromagnetic signal to a server 108 based on the electromagnetic signal being a valid signal, receive an identification result of the electromagnetic signal from the server 108, and send the identification result of the electromagnetic signal to the processor 120.

Figure 3:
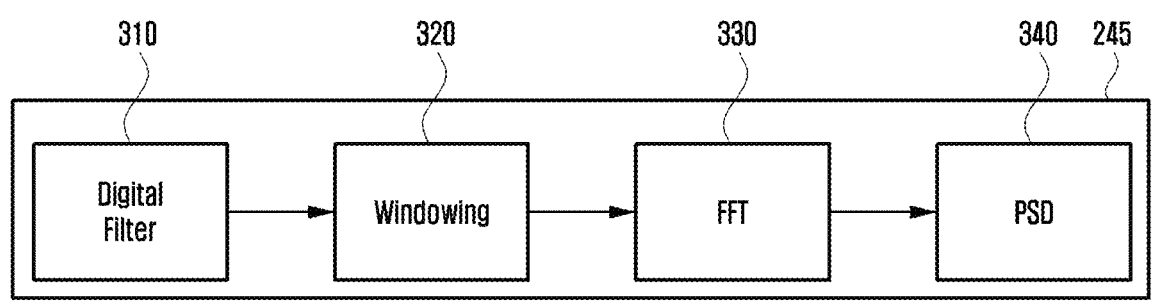
FIG. 3 illustrates a block diagram of a configuration of an MCU according to various embodiments.

FIG. 3 illustrates a block diagram of a configuration of the MCU 245 of FIG. 2B.

According to various embodiments, the MCU 245 may process a digital signal output from the ADC 244 to produce electromagnetic detection data. For example, the MCU 245 may generate the electromagnetic detection data by applying a filtering algorithm 310 (e.g., digital filter) and/or a signal processing algorithm 320 (e.g., windowing) on the digital signal received from the ADC 244. Without being limited thereto, the MCU 245 may send the digital signal received from the ADC 244 to a high level system without applying any process thereto.

According to an embodiment, the MCU 245 converts the time domain electromagnetic detection data to frequency domain electromagnetic detection data for spectrum analysis. Without being limited thereto, the MCU 245 may send the time domain electromagnetic data to the high level system.

According to an embodiment, the MCU 245 may perform FFT 330 on the time domain electromagnetic detection data to produce frequency domain electromagnetic data. According to an embodiment the FTT for use in converting the time domain electromagnetic detection data to the frequency domain electromagnetic data may be represented by Equation 1.

$$x_k = \sum_{n=0}^{N} \infty e^{-jw\pi k \frac{n}{N+1}}$$ [Equation 1]

In the disclosure, the time domain electromagnetic detection data is referred to as analog-digital-converted (ADC) data and the frequency domain electromagnetic detection data is referred to as power spectrum density (PSD) data for convenience of explanation. The EM sensor module 240 may perform various operations with the ADC data and/or the PSD data.

According to various embodiments, the MCU 245 may perform the various operations in different orders and/or different manners. The MCU 245 may also perform the operations in cooperation in whole or in part with another processor (e.g., processor 120) or independently. For example, at least one of a GPU, an MPU, a CPU, or an AP of the electronic device 101 may perform all or some of the operations of the MCU 245.

Figure 4:
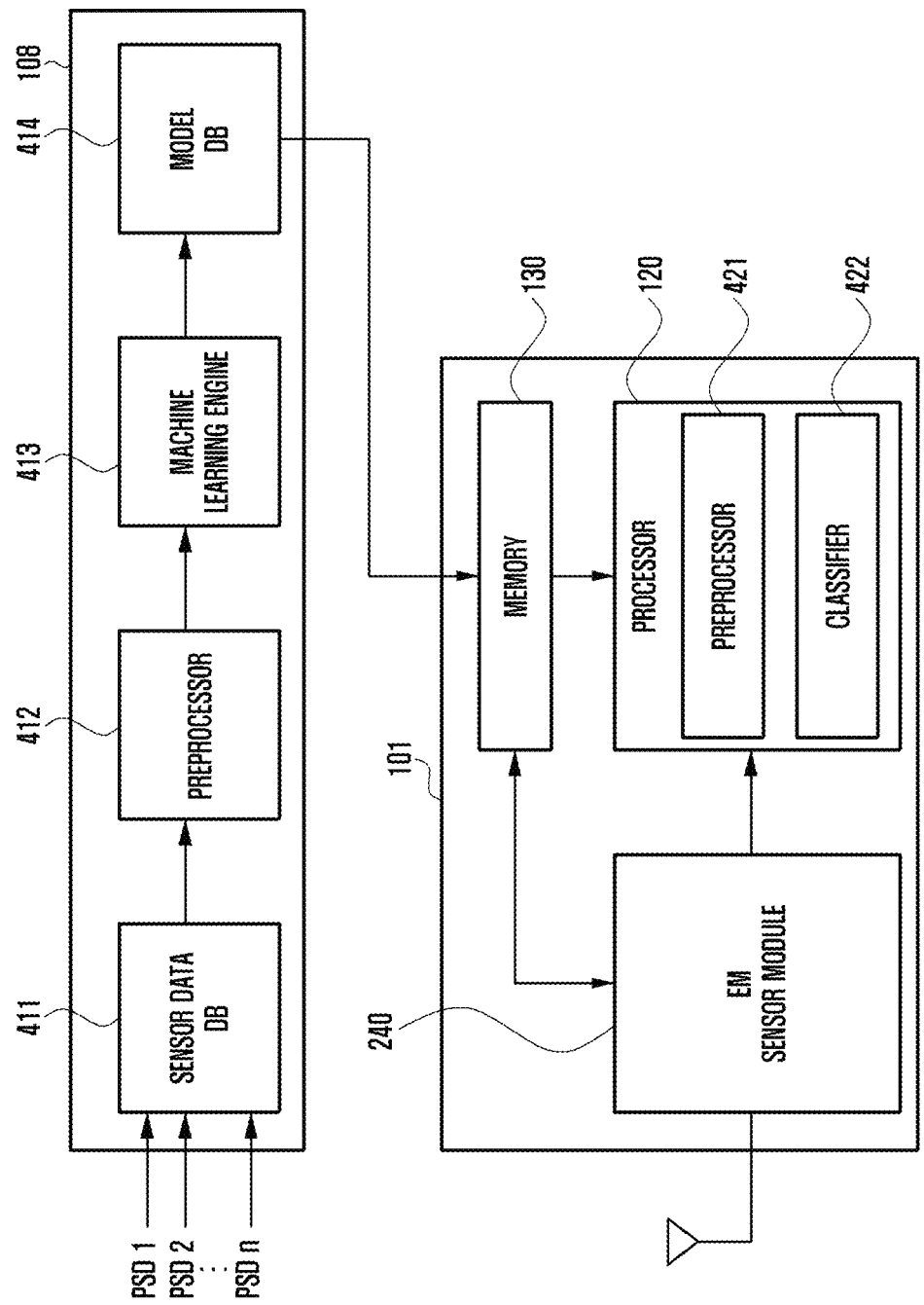
FIG. 4 illustrates a block diagram of a configuration of an electromagnetic detection system according to various embodiments.

FIG. 4 illustrates a block diagram of a configuration of an electromagnetic detection system according to various embodiments.

According to various embodiments, the electromagnetic detection system may include a server 108 and an electronic device 101. According to an embodiment, the electromagnetic detection system may be configured with omission of at least one of the aforementioned components or addition of one or more other components.

According to various embodiments, electromagnetic detection data output by various electronic devices may be used by a machine learning engine for creating a learning model. For example, the electromagnetic detection data output by various electronic devices may be used for categorizing, determining, and/or identifying electronic devices emitting electromagnetic signals.

According to various embodiments, the server 108 (e.g., cloud server) may include a sensor data database (DB) (e.g., raw data DB), a preprocessor 412, a machine learning engine 413, and a model DB 414.

According to an embodiment, the sensor data DB 411 may store unique electromagnetic signals emitted by electronic devices. According to an embodiment, the preprocessor 412 may perform preprocessing to convert the unique electromagnetic signals stored in the sensor data DB to a format suitable for machine learning and output the preprocessed signals to the machine learning engine 413. According to an embodiment, the machine learning engine 413 may generate learning module data including information on the unique electromagnetic signals received from the preprocessor 412 and/or unique signals of predetermined external electronic devices. According to an embodiment, the model DB 414 may store learning model data. The model DB 414 may regenerate specific values corresponding to unique signals and store them in the form of a lookup table for quick access of a corresponding program.

According to various embodiments, the server 108 may perform the aforementioned operations in whole or in part in cooperation with a portable communication device (e.g., smartphone), a computer device, a portable multimedia device, a portable medical device, a camera, a wearable device, and an electronic appliance.

According to various embodiments, the electronic device 101 may include a memory 130, a processor 120, and an EM sensor module 240. According to an embodiment, the electronic device 101 may be configured with omission of at least one of the aforementioned components or addition of one or more other components.

According to various embodiments, the electronic device 101 may download learning model data stored in the model DB 414 of the server 108 periodically or in an on-demand manner and store the downloaded data in the memory 130.

According to various embodiments, the processor 120 may include a preprocessor 421 and a classifier 422. According to an embodiment, the preprocessor 421 may perform preprocessing to convert the electromagnetic detection data received from the EM sensor module 240 to a format suitable for machine learning and output converted electromagnetic detection data to the classifier 422. The classifier 422 may compare the electromagnetic detection data and the model data stored in the memory 130 of the electronic device 101 to retrieve a model similar in waveform.

According to an embodiment, the classifier 422 may output a score (Gaussian mixture model (GMM) score) table showing similarities between the electromagnetic detection data received from an external electronic device and models stored in the memory 130. For example, assuming that the memory 130 of the electronic device 101 stores model data of a television (TV), a laptop, a phone, and a smart watch, if a user brings the electronic device 101 near a TV, the classifier 422 may display a score table with TV 5.2, Laptop 1.5, Phone 0.8, and smart Watch 0.4. In this case, because the TV has the highest score, the processor 120 may identify the detected external electronic device as the TV. According to an embodiment, the electronic device 101 may execute a function corresponding to the identified external electronic device to provide the user with various convenient functions.

Figure 5:
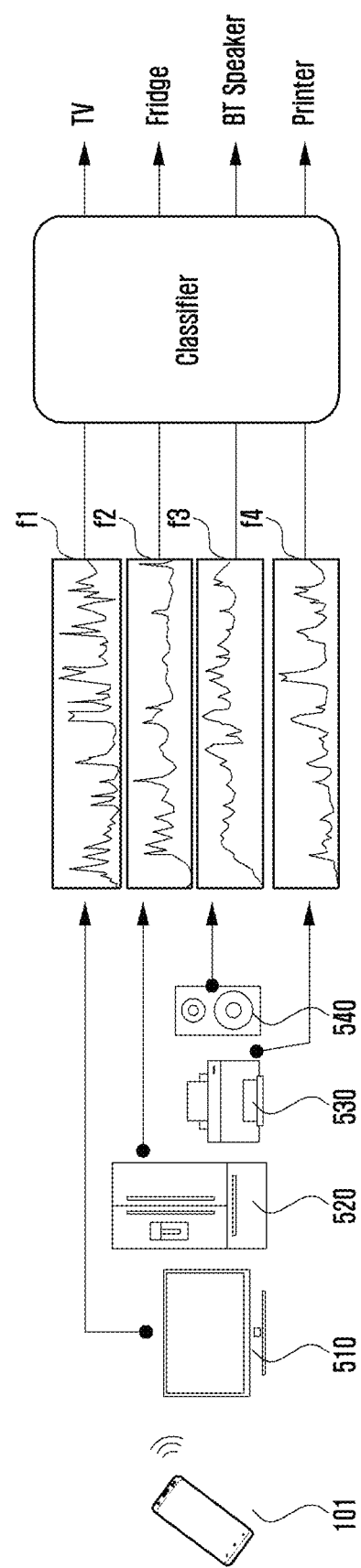
FIG. 5 illustrates a diagram of a procedure for identifying external electronic devices around an electronic device according to various embodiments.

FIG. 5 illustrates a diagram of a procedure for identifying external electronic devices around an electronic device according to various embodiments.

In reference to FIG. 5, there may be a plurality of external electronic devices 510, 520, 530, and 540 (e.g., electronic devices 102 and 104 in FIG. 1) around the electronic device 101. For example, the external electronic devices 510, 520, 530, and 540 may include a TV, a refrigerator, a printer, and a Bluetooth speaker. According to an embodiment, the external electronic devices 510, 520, 530, and 540 may each include various subcomponents, which emit electromagnetic interference (EMI) as electromagnetic signals. For example, the external electronic devices 510, 520, 530, and 540 may emit unique signals in predetermined frequency bands (e.g., about 1 kHz about 2 MHz).

According to various embodiments, if the electronic device 101 approaches one of the external electronic devices 510, 520, 530, and 540, it may detect a unique signal from a dominant EMI by means of the EM sensor module 240, identify or classify the corresponding external electronic device based on the unique signal, and display information on the identified external electronic device. According to an embodiment, the information on the identified external electronic device may be displayed on a display (e.g., display device 160 in FIG. 1) of the electronic device 101. Without being limited thereto, the information on the identified external electronic device may be output in an audio format.

According to various embodiments, the electronic device 101 may include a memory 130, which stores model data (e.g., lookup table) including unique signals corresponding to the external electronic devices 510, 520, 530, and 540. Without being limited to thereto, the model data may be stored in the external server 108 that is capable of communicating with the electronic device 101 through a network. The electronic device 101 may analyze electromagnetic interference signals of the external electronic device identified through the communication with the server 108. For example, the electronic device 101 may transmit the detected signal information to the server 108 and receive identity information of the external electronic device from the server 108.

According to various embodiments, the electronic device 101 may execute a predetermined application based on the identity information of the external electronic device. For example, if the external electronic device is a TV, the electronic device 101 may automatically execute a remote control application and activate connectivity to the TV simultaneously. According to various embodiments, the user may let the external electronic device enter a standby mode where the user can control the external electronic device via the electronic device 101 just by bring the electronic device 101 near the external electronic device, which improves user convenience.

Figure 6:
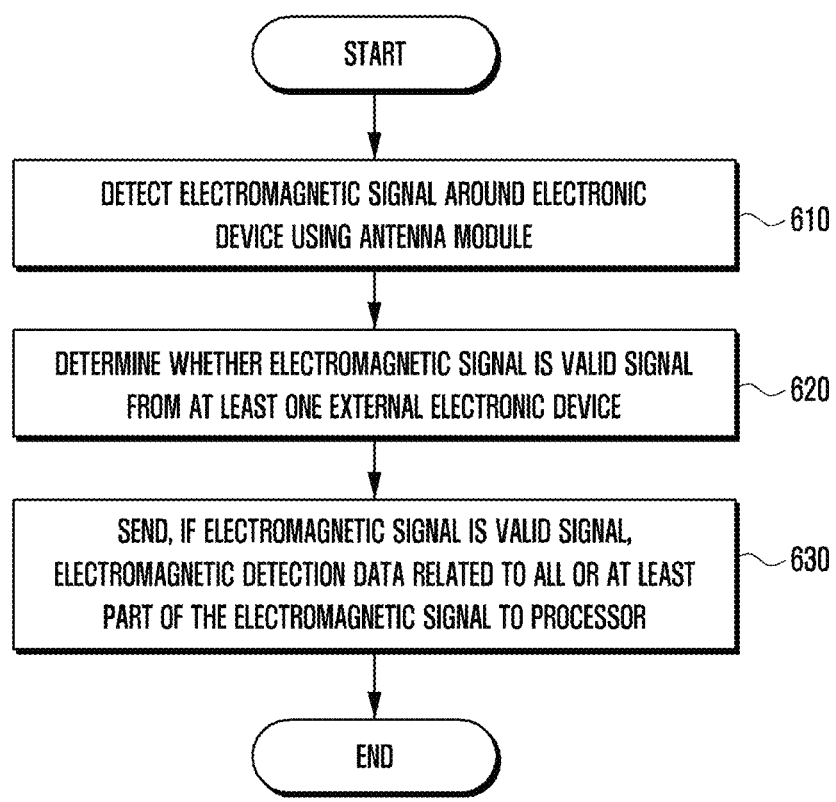
FIG. 6 illustrates a flowchart of an operation of an EM sensor module 240 of an electronic device 101 according to various embodiments.

FIG. 6 illustrates a flowchart of an operation of an EM sensor module 240 of an electronic device 101 according to various embodiments.

In reference to FIG. 6, the EM sensor module 240 may detect electromagnetic signals around the electronic device 101 by means of the antenna module 197 at step 610.

For example, if the user brings the electronic device 101 including the EM sensor module 240 near (or to make contact with) at least one external electronic device, the EM sensor module 240 inside the electronic device 101 may detect electromagnetic signals emitted from the external electronic device by means of the antenna module 197. According to an embodiment, the EM sensor module 240 may detect electromagnetic signals (e.g., noise signals) caused by ambient noise components even in an environment where there is no external electronic device around.

According to an embodiment, the EM sensor module 240 may be activated based on a state of the electronic device 101 or a predetermined condition related to the electronic device. For example, whether the electronic device 101 is in a lock state, whether the display (e.g., display device 160 in FIG. 1) is On/Off, or whether the data acquired by the sensor module 176 may determine whether to activate the EM sensor module 240. For example, the EM sensor module 240 may be configured to be activated only in the state where the electronic device 101 is unlocked or the display is turned on, thereby reducing unnecessary system load and electric current consumption.

In an embodiment, the EM sensor module 240 may be activated based on a user input made with a button or a touch gesture designated for activating the EM sensor module 240 or based on execution of a designated application.

At step 620, the EM sensor module 240 may determine whether the electromagnetic signal is a valid signal emitted by at least one external electronic device (or verify validity of the electromagnetic signal). For example, the EM sensor module 240 may filter out an electromagnetic signal (e.g., noise signal) caused by an environmental noise component as invalid data. According to an embodiment, the EM sensor module 240 may determine whether the detected electromagnetic signal fulfils a predetermined condition to verify the validity of the electromagnetic signal. For example, the EM sensor module 240 may apply a normalization function to the detected electromagnetic signal to produce normalized data and verify the validity of the electromagnetic signal with the normalized data. According to an embodiment, the EM sensor module 240 may compare the normalized data with a predetermined threshold value and verify the validity of the electromagnetic signal based on a result of the comparison.

If the electromagnetic signal is a valid signal, the EM sensor module 240 may send, at step 630, electromagnetic detection data related to all or at least part of the electromagnetic signal to the processor 120.

According to various embodiments, the EM sensor module 240 may analyze the electromagnetic signal received from the external electronic device, generate the electromagnetic detection data related to the electromagnetic signal, and send the electromagnetic detection data to the processor 120. According to an embodiment, the electromagnetic detection sensor module 240 may send to the processor 120 a wakeup signal for awaking the processor along with the electromagnetic detection data. According to an embodiment, the EM sensor module 240 may send to the processor the electromagnetic signal received from the external electronic device, the electromagnetic signal not being processed.

According to various embodiments of the disclosure, a method for controlling the electronic device 101 including the EM sensor module 240 may include detecting an electromagnetic signal around the electronic device 101 by means of the antenna module 197, determining at step 620 whether the electromagnetic signal is a valid signal from at least one external electronic device, and sending, if the electromagnetic signal is a valid signal, electromagnetic detection data related in whole or in part to the electromagnetic signal from the EM sensor module 240 to the processor 120.

According to various embodiments of the disclosure, the method for controlling the electronic device 101 including the EM sensor module 240 may include sending, if the electromagnetic signal is a valid signal, a wakeup signal for awaking the processor 120 along with the electromagnetic detection data from the EM sensor module 240 to the processor 120.

Figure 7A:
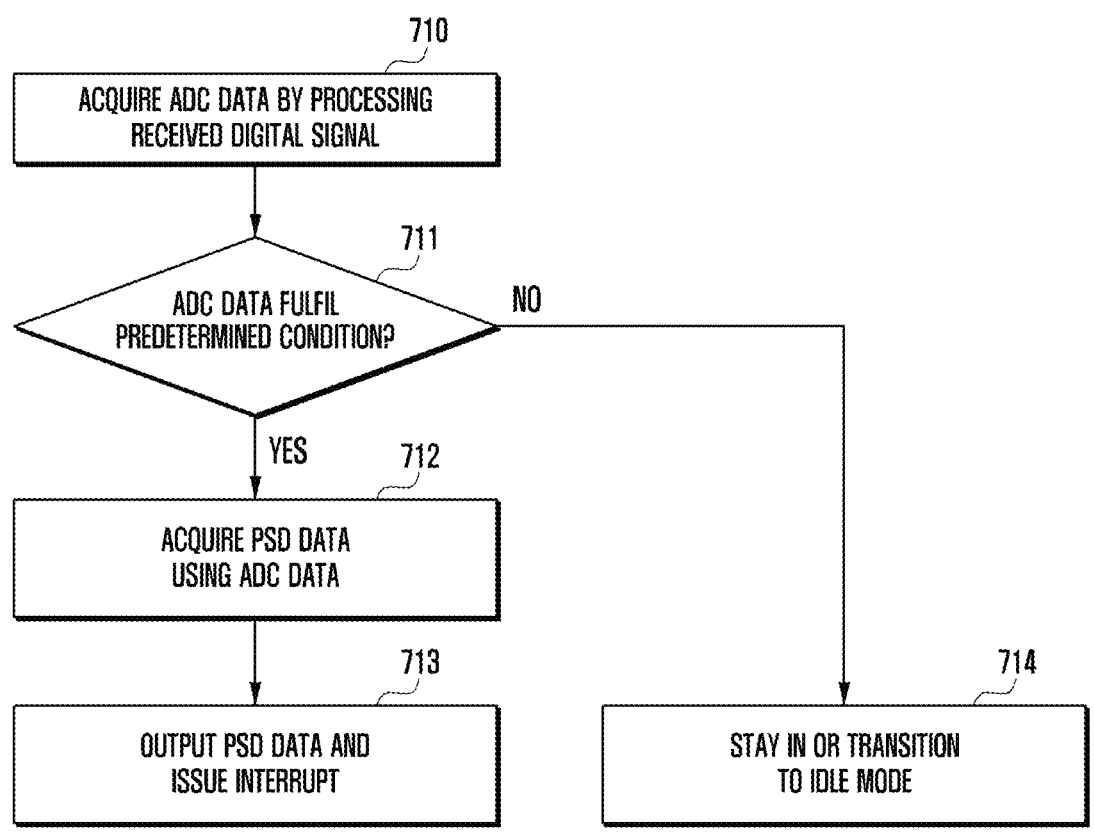
FIGS. 7A and 7B illustrate flowcharts of operations of the MCU 245 of the EM sensor module according to various embodiments.
Figure 7B:
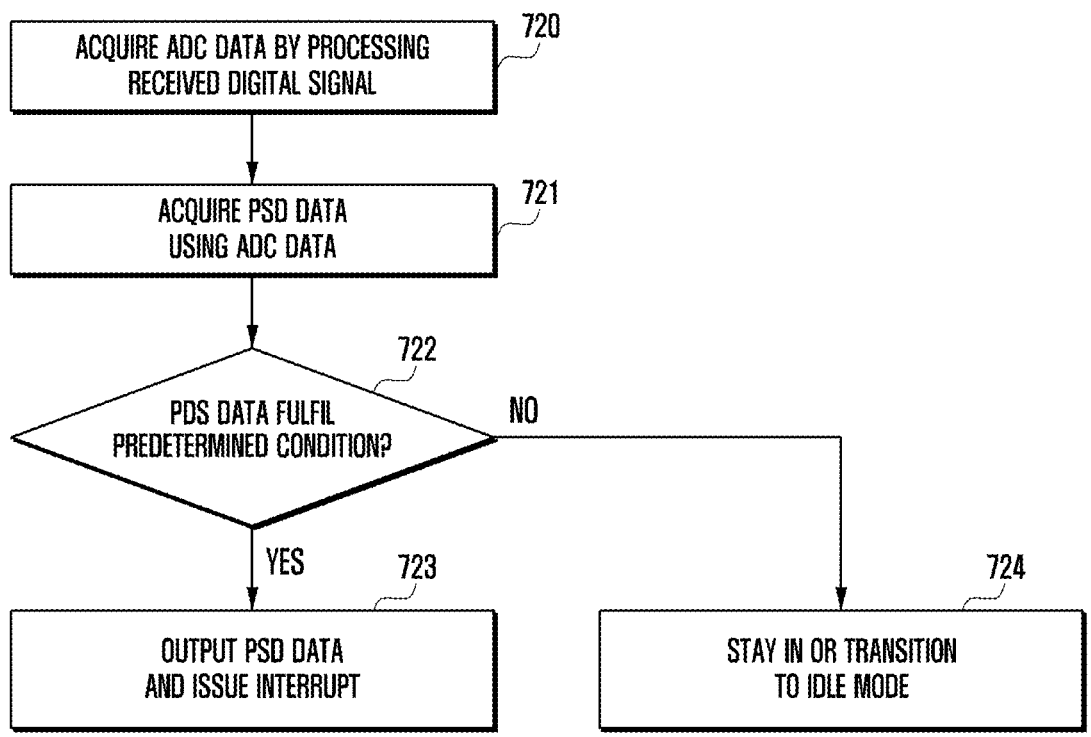

FIGS. 7A and 7B illustrate flowcharts of operations of the MCU 245 of the EM sensor module according to various embodiments.

In reference to FIG. 7A, the MCU of the EM sensor module 240 may verify the validity of an electromagnetic signal using time domain electromagnetic detection data (e.g., ADC data).

At step 710, the MCU 245 may process a digital signal received from the ADC 244 to produce ADC data. For example, the ADC data may be generated and/or acquired by applying a filtering algorithm 310 (e.g., digital filter) and/or a signal processing algorithm (320 (e.g., windowing) on the digital signal.

At step 711, the MCU 245 may determine whether the ADC data fulfils a predetermined condition to verify the validity of the signal from the external electronic device. For example, the validity of the electromagnetic signal may be verified by comparing an effective value of the ADC data with a predetermined threshold value.

If it is determined at step 711 that the ADC data is valid, the procedure goes to step 712. At step 712, the MCU may acquire PSD data using the ADC data. For example, it may be possible to apply FFT 330 to the ADC data to produce frequency domain data.

At step 713, the MCU 245 may, at the same time, output the converted PSD data and issue an interrupt to wake up a high level system. For example, the MCU 245 may execute a definition (e.g., protocol) agreed in software by operating a designated hardware interrupt pin (e.g., processor 120) rather than the EM sensor module or using a communication line for outputting data.

If it is determined at step 711 that the ADC data is invalid, the procedure goes to step 714. At step 714, the MCU 245 may control the high level system to stay in or transition to a preconfigured mode such as an idle mode and a sleep mode.

In reference to FIG. 7B, the MCU 245 of the EM sensor module 240 may verify the validity of an electromagnetic signal using frequency domain electromagnetic detection data (e.g., PSD data).

At step 720, the MCU 245 may process a digital signal received from the ADC 244 to produce ADC data. For example, the ADC data may be generated and/or acquired by applying a filtering algorithm 310 (e.g., digital filter) and/or a signal processing algorithm (320 (e.g., windowing) on the digital signal.

At step 721, the MCU 245 may acquire PSD data using the ADC data. For example, the MCU 245 may perform FFT 330 to the ADC data to produce the PSD data.

At step 722, the MCU 245 may determine whether the converted PSD data fulfils a predetermined condition to verify the validity of the signal from the external electronic device. For example, the validity of the signal may be verified by comparing a decibel (dB) value (e.g., average decibel volt (dBV)) of the PSD data and a predetermined threshold value.

If it is determined at step 722 that the PSD data is valid, the procedure goes to step 723. At step 723, the MCU 245 may, at the same time, output the converted PSD data and issue an interrupt to wake up a high level system.

If it is determined at step 722 that the PSD data is invalid, the procedure goes to step 724. At step 724, the MCU 245 may control the high level system to stay in or transition to a preconfigured mode such as an idle mode and a sleep mode.

Figure 8:
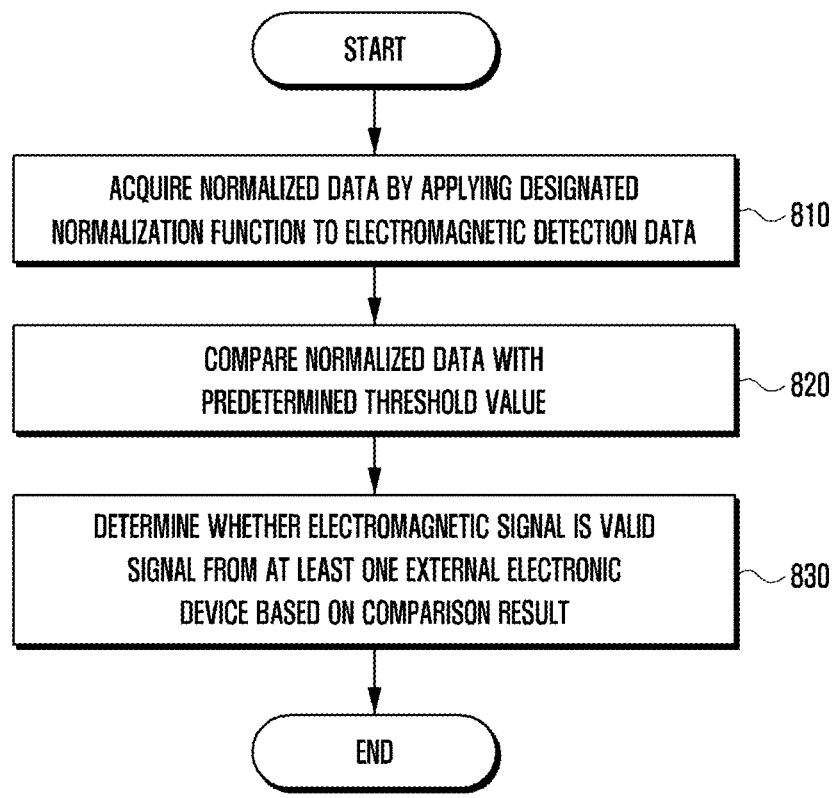
FIG. 8 illustrates a flowchart of a method for verifying validity of an electromagnetic signal according to various embodiments.

FIG. 8 illustrates a flowchart of a method for verifying validity of an electromagnetic signal according to various embodiments. FIG. 8 may be an embodiment of step 620 of FIG. 6.

In reference to FIG. 8, the EM sensor module 240 of the electronic device 101 may apply a designated normalization function (e.g., probability statistical variable and/or physical variable) to electromagnetic detection data to acquire normalized data.

The designated normalization function may include at least one of a sum function, an average function, a maximum (max) function, a minimum (min) function, a standard deviation (Std) function, a skewness function, a kurtosis function, or a root mean square (RMS) function. According to various embodiments, the normalization function (e.g., probability statistical variable and/or physical variable) is not limited to the aforementioned functions. For example, the EM sensor module 240 may be configured to acquire an effective value of the ADC data or an average value of the PSD data.

At step 820, the EM sensor module 24 may compare the normalized data with a predetermined threshold value.

According to various embodiments, the electronic device 101 may detect electromagnetic signals output by various external electronic devices (e.g., electronic devices 102 and 104 in FIG. 1) under various conditions and perform a big data analysis on the signals to designate a threshold value. Table 1 shows data acquired as effective values of ADC data and average values of PSD data after detecting electromagnetic signals output by various electronic devices under various conditions.

TABLE 1

| Distance (cm) | 0 | 0.5 | 1 | 2 | 3 | 5 | Ambient |
|---|---|---|---|---|---|---|---|
| Average value of PSD data (dBV) | 52.44 | 33.88 | 32.88 | 31.73 | 30.83 | 30.23 | 27.76 |
| Effective value of ADC data (V) | 4.60 | 0.98 | 1.10 | 1.04 | 1.03 | 1.10 | 1.00 |

In reference to Table 1, it is shown that the average value of PSD data detected by the EM sensor module 240 of the electronic device 101 is about 52.44 dBV in the case where the electronic device 101 makes contact with various external electronic devices (e.g., about distance of 0 cm). It is shown that the average value of the PSD data caused by an environmental noise (or ambient noise) component is about 27.76 dBV in an environment (e.g., ambient environment)

where there is no nearby external electronic device. The electronic device 101 may designate a certain value in the range from about 27.76 dBV to about 52.44 dBV as a threshold value for the average value of the PSD data using the data. For example, the electronic device 101 may set the threshold value to about 30 dBV. In this case, the EM sensor module 240 may detect an electromagnetic signal, acquire an average value of corresponding PSD data, and determine whether the average value is equal to or greater than the designated value of about 30 dBV to verify the validity of the electromagnetic signal.

In reference to Table. 1, it is shown that the effective value of the ADC value detected by the EM sensor module 240 is about 4.60 V in the case where the electronic device 101 makes contact with various external electronic devices (e.g., about distance of 0 cm). It is shown that the average value of the ADC data caused by an environmental noise (or ambient noise) component is about 1.00 V in an environment (e.g., ambient environment) where there is no nearby external electronic device. The electronic device 101 may designate a certain value in the range from about 1.00 V to about 4.60 V as a threshold value for the effective value of the ADC data using the data and verify the validity of the detected electromagnetic signal.

According to various embodiments, the designated threshold value may be stored in the memory 130 of the electronic device 101 or an external server (e.g., server 108 in FIG. 1) that is capable of communicating with the electronic device through a network.

At step 830, the EM sensor module 230 may determine whether the electromagnetic signal is a valid signal from at least one external electronic device based on a result of the comparison.

According to an embodiment, the EM sensor module 240 may determine that the detected electromagnetic device is a valid signal based on the normalized data being greater than the predetermined threshold value. If it is determined that the electromagnetic signal is a valid signal, the EM sensor module 240 may send the electromagnetic signal to a high level system (e.g., processor 120). If it is determined that the normalized data is equal to or less than the predetermined threshold value, the EM sensor module 240 may control the high level system to stay in or transition to a preconfigured mode such as an idle mode and a sleep mode.

According to various embodiments of the disclosure, a method for controlling the electronic device 101 including the EM sensor module 240 may include determining whether the electromagnetic signal received from the external electronic device is a valid signal at step 620, and determining at step 620 may include acquiring normalized data by applying a designated normalization function to the electromagnetic detection data at step 810 and comparing the normalized data with a predetermined threshold value at step 820.

According to various embodiments of the disclosure, the method for controlling the electronic device 101 including the EM sensor module 240 may include verifying, at the EM sensor module 240, that the electromagnetic signal is valid based on the normalized data being greater than the designated threshold value.

Figure 9:
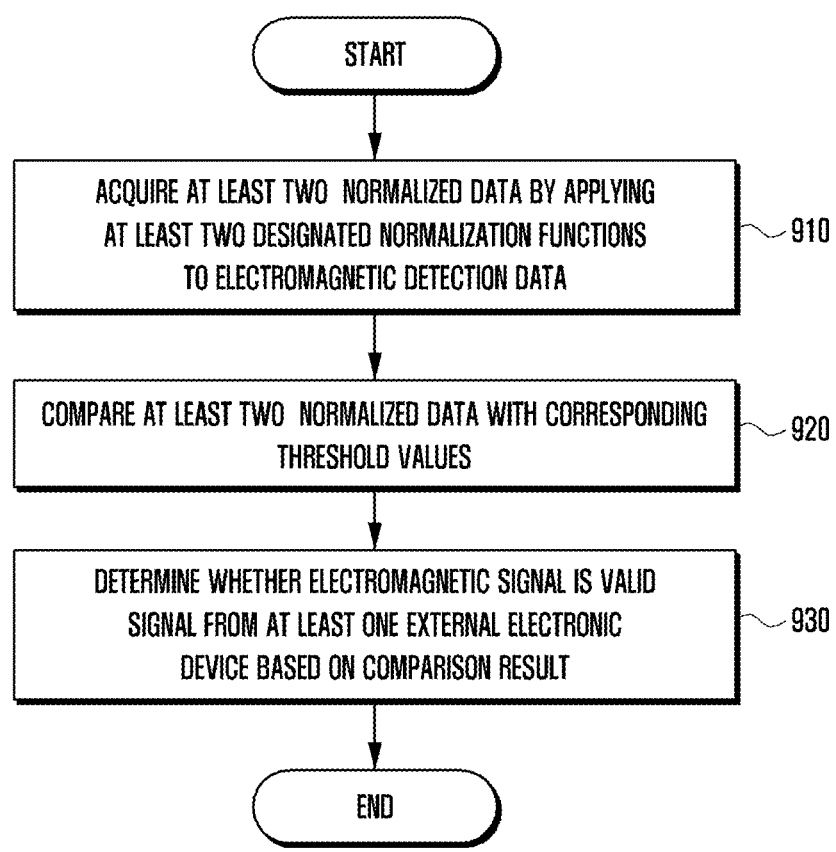
FIG. 9 illustrates a flowchart of a method for verifying validity of an electromagnetic signal according to various embodiments.

FIG. 9 illustrates a flowchart of a method for verifying validity of an electromagnetic signal according to various embodiments. FIG. 9 may be an embodiment of step 620 of FIG. 6.

In reference to FIG. 9, the EM sensor module 240 may acquire at least two normalized data, at step 910, by applying at least two normalization functions (e.g., probability statistical variables and/or physical variables) to electromagnetic detection data.

The designated normalization functions may include at least one of a sum function, an average function, a maximum (max) function, a minimum (min) function, a standard deviation (Std) function, a skewness function, a kurtosis function, or an RMS function. According to various embodiments the normalization functions (e.g., probability statistical variables and/or physical variables) are not limited to the aforementioned functions.

At step 920, the EM sensor module 240 may compare the at least two normalization data with corresponding threshold values.

According to various embodiments, the electronic device 101 may continuously collect electromagnetic signals caused by environment noise components and perform a big data analysis to designate an ambient group. For example, the electronic device 101 may apply at least two designated normalization functions to the signals collected in the ambient environment and designate an ambient group of categorized noise signals.

According to an embodiment, the designated threshold values may define boundary lines for the ambient group. For example, the EM sensor module 240 may determine whether an electromagnetic signal received from the outside belongs to the ambient group, using at least two normalized data.

At step 930, the EM sensor module 240 may determine whether the electronic signal is a valid signal from at least one external electronic device based on a result of the comparison.

For example, if the detected electromagnetic signal does not belong to the designated ambient group, the EM sensor module 240 may send electromagnetic detection data related to all or at least part of the electromagnetic signal to a high level system (e.g., processor 120). Meanwhile, if the detected electromagnetic signal belongs to the designated ambient group, the EM sensor module 240 may control the high level system to stay in or transition to a predetermined mode such as an idle mode and a sleep mode.

According to various embodiments of the disclosure, a method for controlling the electronic device 101 including the EM sensor module 240 may include determining whether the electromagnetic signal received from the external electronic device is a valid signal at step 620, and determining at step 620 may include acquiring at least two normalized data by applying at least two corresponding designated normalization functions to the electromagnetic detection data at step 920 and comparing the at least two normalized data with predetermined threshold values at step 930.

According to various embodiments, the method for controlling the electronic device 101 including the EM sensor module 240 may be characterized in that the designated threshold values define boundary lines of an ambient group.

Figure 10A:
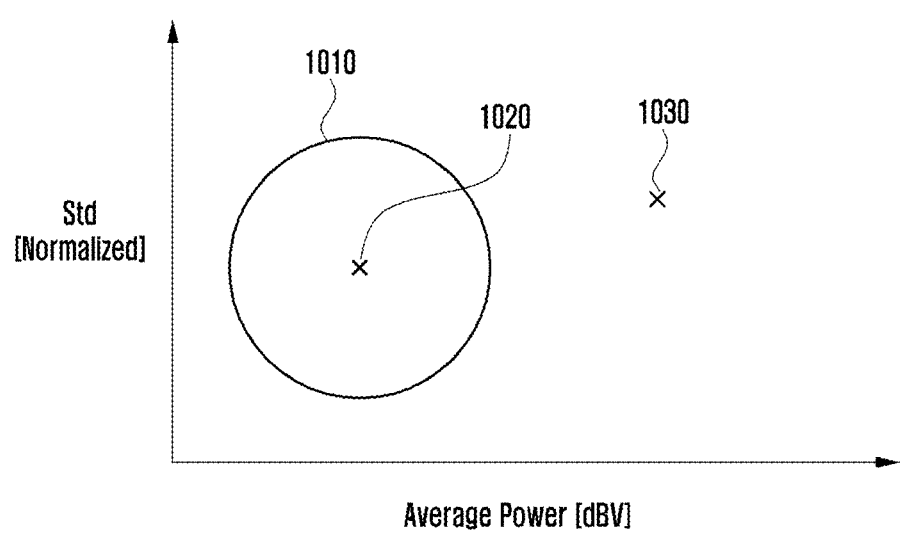
FIGS. 10A and 10B illustrate diagrams for explaining an ambient group according to various embodiments.
Figure 10B:
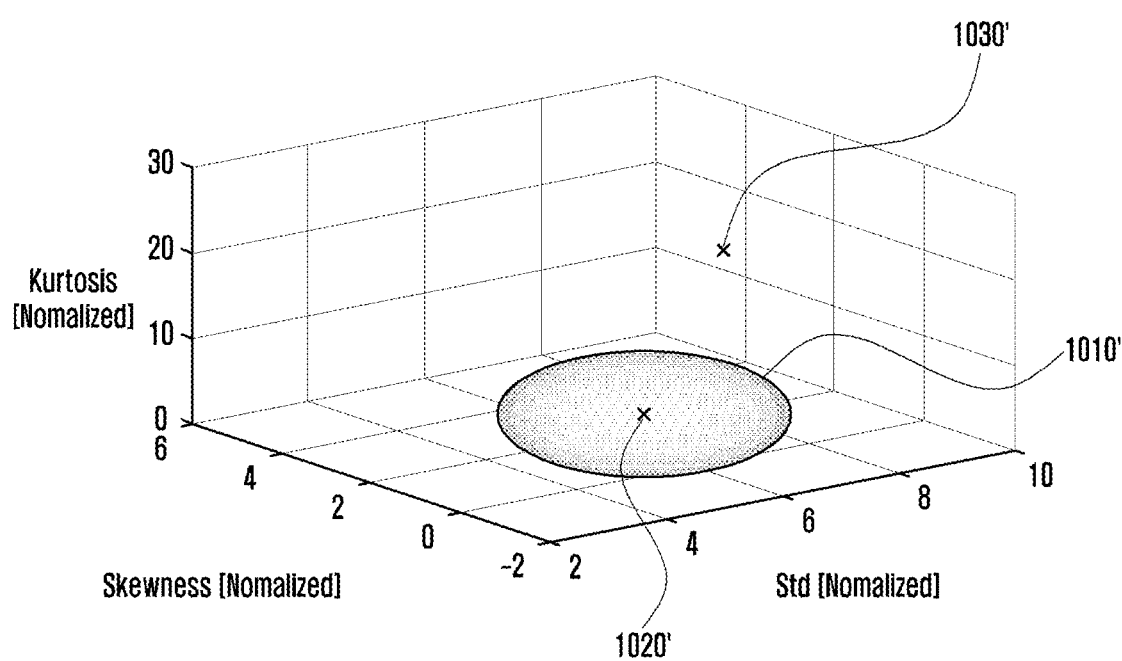

FIGS. 10A and 10B illustrate diagrams for explaining an ambient group according to various embodiments.

According to various embodiments, an ambient group may be designated based on normalized data acquired using a normalization function such as a probability statistical variable and/or a physical variable of noise signals.

In the embodiment of FIG. 10A, a designated ambient group 1010 is expressed in a 2-dimensional graph with an axis representing a standard deviation (e.g., Std axis) and an axis representing an average (e.g., average power axis). According to an embodiment, FIG. 10A is a graph for categorizing an execution result of a validity verification method based on two variables (e.g., average power (Avg) and standard deviation (Std)).

The electronic device 101 may apply at least two normalization functions to two noise signals collected in an ambient environment and designate an ambient group 101 of dense noise signals.

According to various embodiments, the EM sensor module 240 may determine whether an electromagnetic signal detected with the at least two normalized data belongs to the designated ambient group 1010.

For example, if the detected electromagnetic signal 1030 does not belong to the designated ambient group 1010, the EM sensor module 240 may send electromagnetic detection data related to all or at least part of the electromagnetic signal 1030 to a high level system (e.g., processor 120). Meanwhile, if it is determined that the detected electromagnetic signal 1020 belongs to the designated ambient group 1010, the EM sensor module 240 may control the high level system to stay in or transition to a predetermined mode such as an idle mode and a sleep mode.

In reference to FIG. 10B, the electronic device 101 may designate an ambient group 1010' using at least three variables. FIG. 10B is a graph for categorizing an execution result of a validity verification method based on three variables (e.g., standard deviation (Std) value, skewness, and kurtosi s).

For example, it may be possible to designate an ambient group 1010' using a 3-dimensional graph with an axis representing the standard deviation (e.g., Std axis), an axis representing the skewness (e.g., skewness axis), and an axis representing the kurtosis (e.g., kurtosis axis). In this case, the ambient group 1010' may be expressed in a three- or higher-dimensional graph. For example, if it is determined that the detected electromagnetic signal 1030' does not belong to the ambient group 1010', the EM sensor module 240 may determine that the electromagnetic signal 1030' is a valid signal. Meanwhile, if it is determined that the detected electromagnetic signal 1020' belongs to the ambient group 1010', the EM sensor module 240 may determine that the electromagnetic signal 1020' is an invalid signal.

Figure 11:
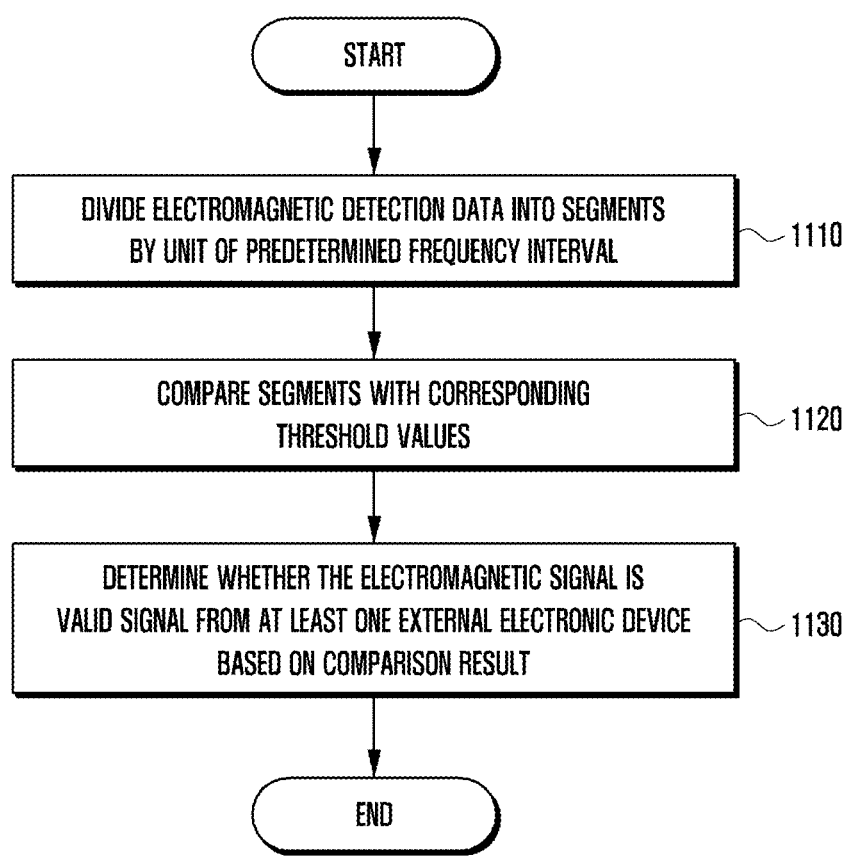
FIG. 11 illustrates a flowchart of a method for verifying validity of an electromagnetic signal according to various embodiments of the disclosure.

FIG. 11 illustrates a flowchart of a method for verifying validity of an electromagnetic signal according to various embodiments of the disclosure. FIG. 11 may be an embodiment of step 620 of FIG. 6.

In reference to FIG. 11, the EM sensor module 240 may divide all or at least part of electromagnetic detection data (e.g., PSD data) by a predetermined unit of frequency interval. For example, among the electromagnetic detection data, the EM sensor module 240 may divide data in the range from about 2 kHz to about 1 MHz by an interval of about 2 kHz to acquire a total number of 499 data segments.

At step 1120, the EM sensor module 240 may compare each of the electromagnetic detection data segments with corresponding threshold values.

According to various embodiments, the electronic device 101 may download the threshold values from the server 108 periodically or in an on-demand manner and store the downloaded threshold values in the memory 130. According to an embodiment, the processor 120 of the electronic device 101 may set and store the threshold value in the memory 130.

According to various embodiments, the memory 130 may store the threshold values corresponding to the data segments obtained through division by the predetermined unit of frequency interval. For example, the memory 130 may store a first threshold value corresponding to a range from about 2 kHz to about 4 kHz, a second threshold value corresponding to a range from about 4 kHz to about 6 kHz, and an $n^{th}$ threshold value (e.g., n=499) corresponding to a range from about 998 kHz to about 1 Mhz.

According to various embodiments, the threshold value per frequency interval may be determined based on noise signals. For example, the electronic device 101 may collect noise signals in an ambient environment and acquire electromagnetic detection data related to all or at least part of the noise signals. Next, the electronic deice 101 may divide electromagnetic detection data for the noise signals into data segments by a predetermined unit of frequency interval and accumulate the noise signals. The electronic device 101 may determine the threshold values using the electromagnetic detection data for the accumulated noise signals. For example, the electronic device 101 may acquire normalized data of per-frequency interval noise signals and determine threshold values based on the normalized data. For example, the electronic device 101 may determine a maximum value, a minimum value, or an average value of the noise signal in the corresponding frequency interval as the corresponding threshold value.

At step 1130, the EM sensor module may determine whether the electromagnetic signal is a valid signal from at least one external electronic device based on a result of the comparison.

According to various embodiments, if it is determined that a number of data of which the normalized data value is greater than the threshold value is greater than a predetermined number, the EM sensor module 240 may determine that the electromagnetic signal is a valid signal. For example, if at least one of the electromagnetic detection data segments has a normalized data value greater than the corresponding threshold value, the EM sensor module 240 may determine that the electromagnetic signal is a valid signal and send the electromagnetic detection data related to all or at least part of the electromagnetic signal to a high level system (e.g., processor 120). Meanwhile, if there is no electromagnetic detection data segment of which the normalized data value is greater than the corresponding threshold value, the EM sensor module may control the higher level system to stay in or transition to a predetermined mode such as an idle mode and a sleep mode.

According to various embodiments, the electronic device may tune the determined threshold values according to a predetermined rule or based on a user input. For example, the electronic device may tune the threshold values by multiplying the threshold values by a tuning variable. For example, the threshold values may be multiplied by a value less than 1 for a decrease or by a value greater than 1 for an increase.

According to various embodiments, a method for controlling the electronic device 101 including the EM sensor module 240 may include determining whether the electromagnetic signal received from the external electronic device is a valid signal at step 620, and determining at step 620 may include dividing the electromagnetic detection data by a predetermined unit of frequency interval at step 1110 and comparing the electromagnetic detection data segments with corresponding threshold values at step 1120.

According to various embodiments of the disclosure, the method for controlling the electronic device 101 including the EM sensor module 240 may include determining that the electromagnetic signal is a valid signal based on at least one of the electromagnetic detection data segments being greater than the corresponding threshold value.

According to various embodiments of the disclosure, the method for controlling the electronic device 101 including the EM sensor module 240 may be characterized in that the EM sensor module 240 is activated based on a state of the electronic device 101 or a predetermined condition related to the electronic device 101.

FIGS. 12A to 12D illustrate diagrams for explaining a method for verifying valid signals based on threshold values determined using noise signals according to various embodiments.

Figure 12A:
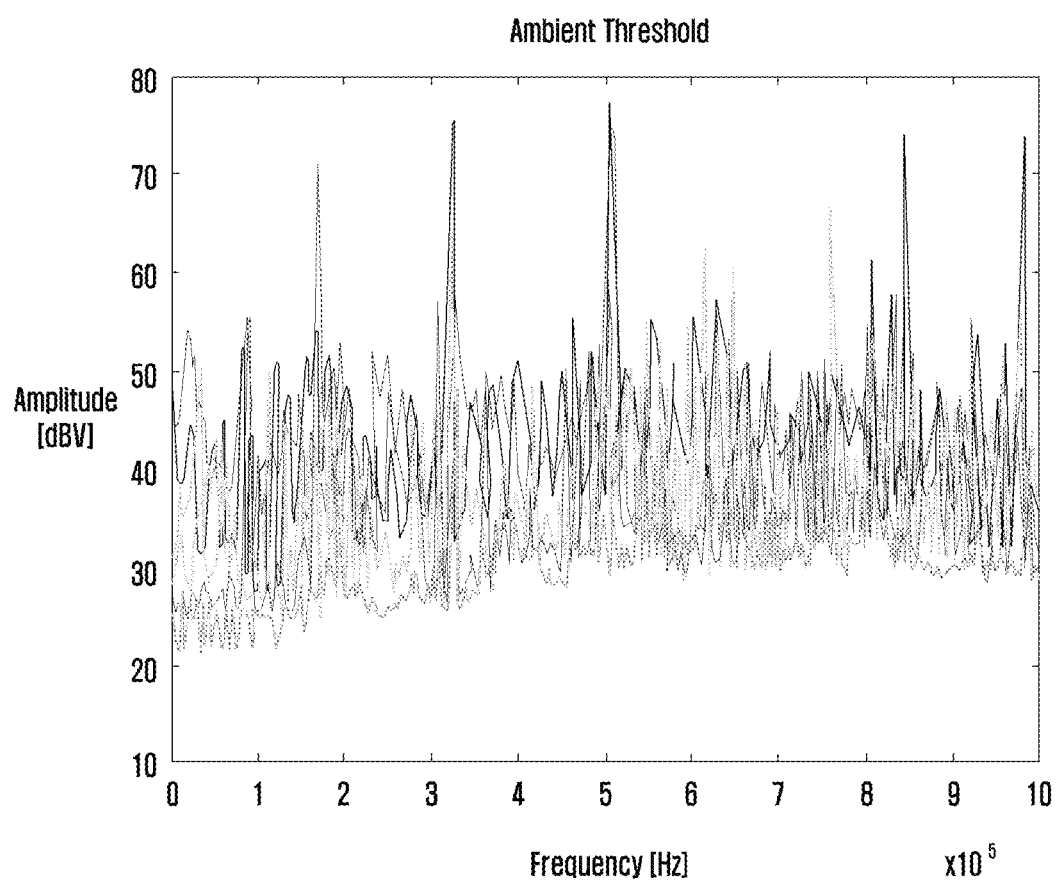
FIGS. 12A, 12B, 12C, and 12D illustrate diagrams for explaining a method for determining threshold values and verifying valid signals according to various embodiments.

In reference to FIG. 12A, the electronic device 101 may collect noise signals and acquire electromagnetic detection data (e.g., PSD data) related to all or at least part of the noise signals. In reference to FIG. 12A, the electronic device 101 may collect about 238 noise signals, convert the noise signals to electromagnetic detection data, and store the noise signals in the memory in an accumulative manner. According to an embodiment, the electronic device 101 may divide all or at least part of the electromagnetic detection data by a predetermined unit of frequency interval and store the electromagnetic detection data in the memory in an accumulative manner.

Figure 12B:
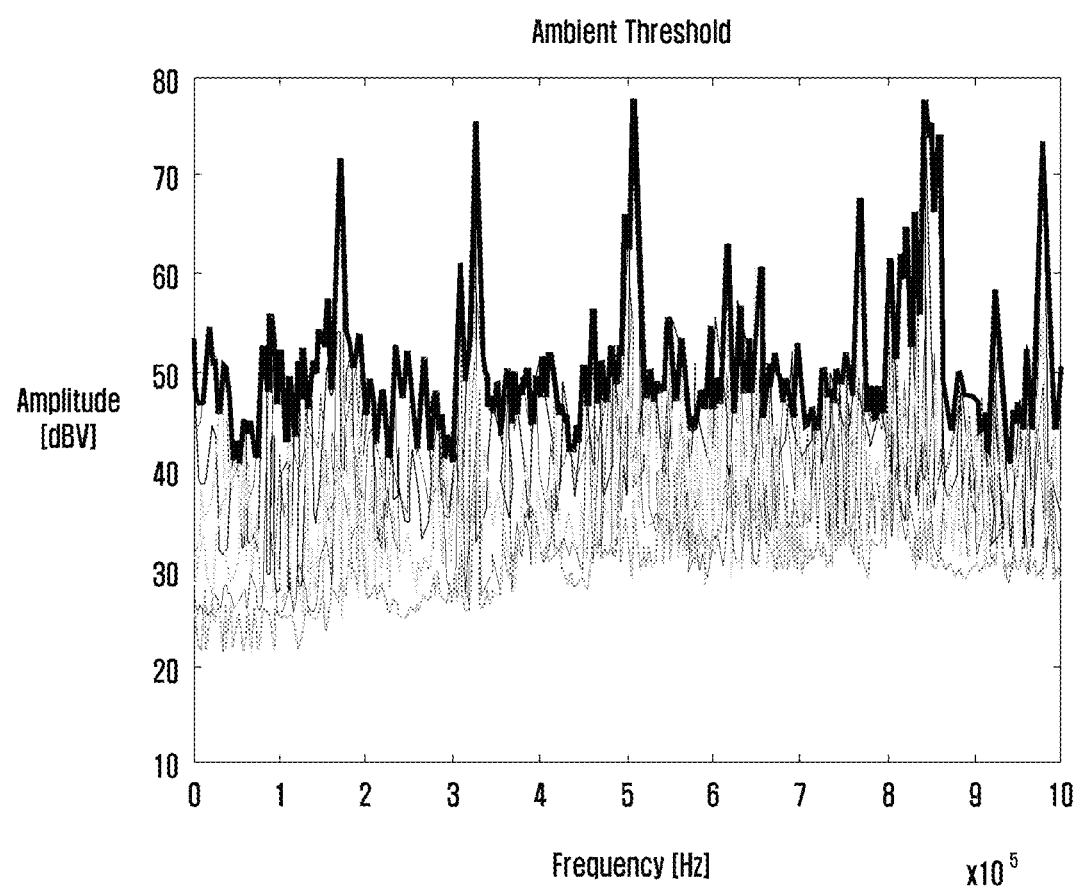

In reference to FIG. 12B, the electronic device may determine threshold values using the electromagnetic detection data of the accumulated noise signals. FIG. 12B shows an example of determining (calculating) threshold values using maximum values (e.g., Max function) obtainable from the per-frequency interval noise signals. In reference to FIG. 12B, because the noise signal in a frequency interval about 500 kHz to about 502 kHz has a maximum level of about 78 dBV, a threshold value of 78 dBV is determined in a frequency interval of about 500 kHz to about 502 kHz.

Figure 12C:
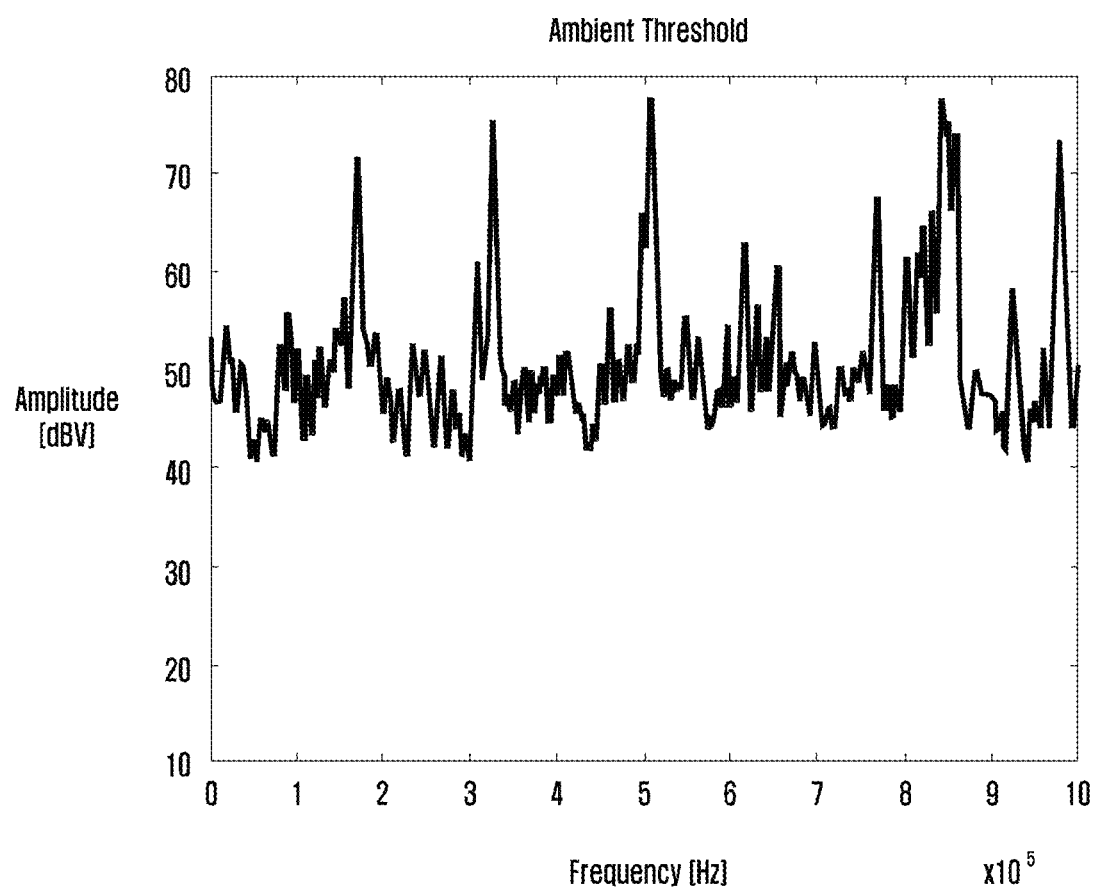

FIG. 12C shows threshold values acquired using noise signals. The electronic device 101 may determine whether a detected electromagnetic signal is a valid signal from at least one external electronic device using the acquired threshold values. For example, if at least one of the electromagnetic detection data segments of the detected electromagnetic signal is greater than the corresponding threshold value, the electromagnetic signal is verified as a valid signal. For example, given the threshold value of 78 dBV in a frequency interval about 500 kHz to about 502 kHz, if an electromagnetic detection data segment corresponding to the frequency interval from about 500 kHz to about 502 kHz is greater than the threshold value of 78 dBV, the electromagnetic signal may be verified as a valid signal regardless of other frequency intervals.

Figure 12D:
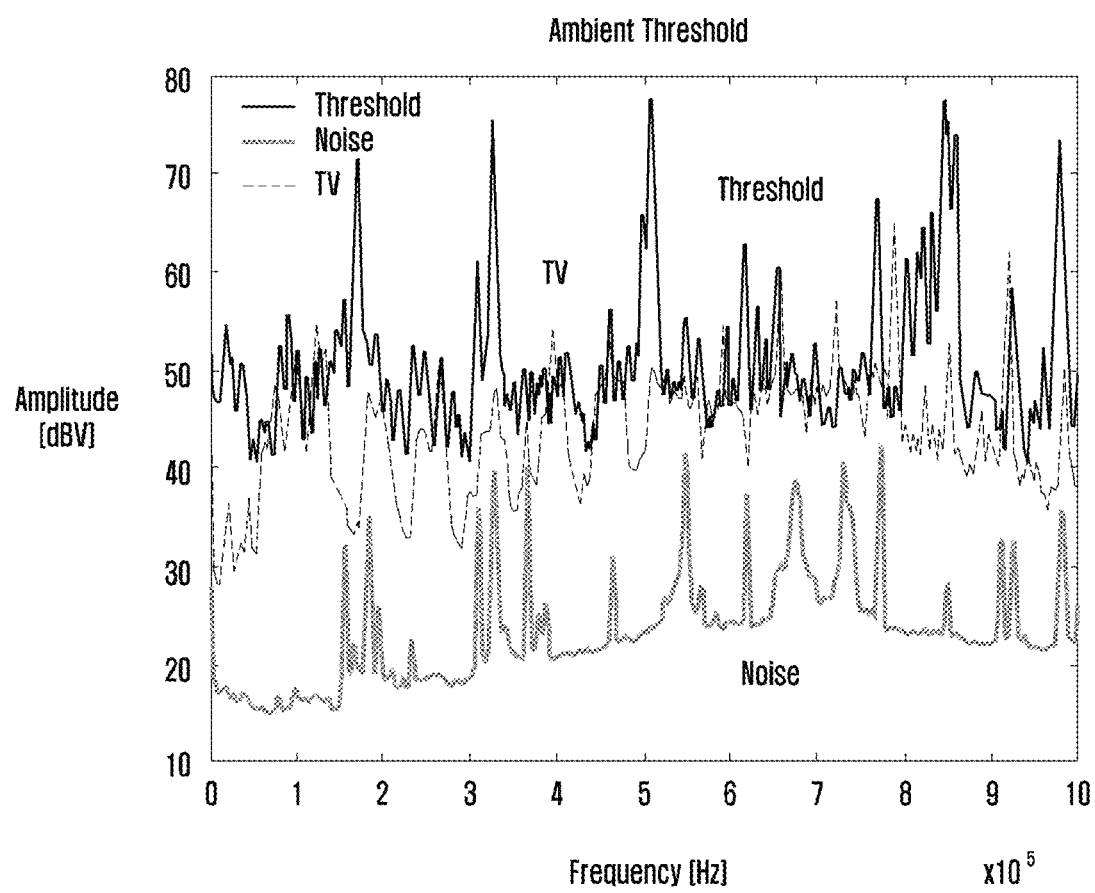

FIG. 12D shows a case where an electromagnetic signal emitted from a TV is received along with noise signals in an ambient environment. According to an embodiment, one or more data segments of the electromagnetic detection data of the electromagnetic signal emitted from the TV is greater than the corresponding threshold values. On the basis of this, the EM sensor module 240 may determine the received electromagnetic signal is a valid signal. If the electromagnetic signal is verified as a valid signal, the EM sensor module 240 may send to the processor 120 the electromagnetic detection data related to all or at least part of the electromagnetic signal emitted from the TV. Meanwhile, all electromagnetic detection data segments of the ambient environmental noise signal are unlikely to be greater than the corresponding threshold values. Accordingly, the EM sensor module 240 may determine the corresponding electromagnetic signal is an invalid signal, i.e., ambient environmental noise signal.

The electronic device 101 according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturers server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
    an electromagnetic (EM) sensor module;
    an antenna module electrically connected to the EM sensor module configured to detect a unique signal corresponding to an electromagnetic interference created by an external electronic device;
    a memory operationally connected to the EM sensor module; and
    a processor operationally connected to the EM sensor module,
    wherein the EM sensor module is configured to:
        detect an electromagnetic signal around the electronic device using the antenna module;
        while the processor is in a sleep mode, determine whether the electromagnetic signal is a valid signal transmitted from at least one external electronic device or is invalid data caused by an environmental noise component in an environment where there is no external electronic device around, wherein to determine whether the electromagnetic signal is a valid signal from the at least one external electronic device, the EM sensor module is configured to:
        acquire at least two normalized data by applying at least two corresponding normalization function to electromagnetic detection data;
        compare the at least two normalized data with corresponding threshold values; and
        determine whether the electromagnetic signal is a valid signal from the at least one external electronic device based on a result of the comparison of the at least two normalized data with corresponding threshold values; and
        based on the electromagnetic signal being the valid signal, send the electromagnetic detection data related to all or at least part of the electromagnetic signal and a wakeup signal for awaking the processor in the sleep mode to the processor.

2. The electronic device of claim 1, wherein the electromagnetic detection data are time domain data generated by processing the electromagnetic signal or frequency domain data generated by performing Fast Fourier Transform (FFT) on the time domain data.

3. The electronic device of claim 1, wherein the EM sensor module is configured to:
    acquire normalized data by applying a designated normalization function to the electromagnetic detection data;
    compare the normalized data with a predetermined threshold value; and
    determine whether the electromagnetic signal is a valid signal from the at least one external electronic device based on a result of the comparison of the normalized data with a predetermined threshold value.

4. The electronic device of claim 3, wherein the EM sensor module is configured to determine that the electromagnetic signal is a valid signal based on the normalized data being greater than the predetermined threshold value.

5. The electronic device of claim 1, wherein the corresponding threshold values define a boundary line of an ambient group analyzed through big data analysis of electromagnetic signals caused by environment noise components.

6. The electronic device of claim 1, wherein the EM sensor module is configured to:
    divide the electromagnetic detection data by a predetermined unit of frequency interval;
    compare divided electromagnetic detection data with corresponding threshold values; and
    determine that the electromagnetic signal is a valid signal from the at least one external electronic device based on a result of the comparison of the divided electromagnetic detection data with corresponding threshold values.

7. The electronic device of claim 6, wherein the EM sensor module is configured to determine that the electromagnetic signal is a valid signal based on at least one segment of the electromagnetic detection data being greater than a corresponding threshold value.

8. The electronic device of claim 1, wherein the EM sensor module is activated based on a state of the electronic device or a predetermined condition related to the electronic device.

9. A method for controlling an electronic device including an electromagnetic (EM) sensor module, the method comprising:
    detecting an electromagnetic signal around the electronic device using an antenna module;
    while a processor is in a sleep mode, determining whether the electromagnetic signal is a valid signal transmitted from at least one external electronic device or is invalid data caused by an environmental noise component in an environment where there is no external electronic device around, wherein determining whether the electromagnetic signal is a valid signal from the at least one external electronic device comprises:
        acquiring, by the EM sensor module, at least two normalized data by applying at least two corresponding normalization function to electromagnetic detection data; and based on the electromagnetic signal being a valid signal, sending electromagnetic detection data related to all or at least part of the electromagnetic signal and a wakeup signal for awaking the processor in the sleep mode to the processor.

10. The method of claim 9, wherein determining whether the electromagnetic signal is a valid signal comprises:
acquiring normalized data by applying a designated normalization function to the electromagnetic detection data; and
comparing the normalized data with a predetermined threshold value.

11. The method of claim 10, further comprising determining, at the EM sensor module, that the electromagnetic signal is a valid signal based on the normalized data being greater than the predetermined threshold value.

12. The method of claim 9, wherein determining whether the electromagnetic signal is a valid signal comprises:
comparing the at least two normalized data with corresponding threshold values.

13. The method of claim 12, wherein the corresponding threshold values define a boundary line of an ambient group analyzed through big data analysis of electromagnetic signals caused by environment noise components.

14. The method of claim 9, wherein determining whether the electromagnetic signal is a valid signal comprises:
dividing the electromagnetic detection data by a predetermined unit of frequency interval; and
comparing divided electromagnetic detection data with corresponding threshold values.

15. The method of claim 14, further comprising determining, at the EM sensor module, that the electromagnetic signal is a valid signal based on at least one segment of the electromagnetic detection data being greater than a corresponding threshold value.

16. The method of claim 9, wherein the EM sensor module is activated based on a state of the electronic device or a predetermined condition related to the electronic device.

17. An electronic device comprising:
an electromagnetic (EM) sensor module configured to detect a unique signal corresponding to an electromagnetic interference created by an external electronic device;
an antenna module electrically connected to the EM sensor module;
a memory operationally connected to the EM sensor module; and
a processor operationally connected to the EM sensor module,
wherein the EM sensor module is configured to:
detect an electromagnetic signal around the electronic device using the antenna module,
while the processor is in a sleep mode, determine whether the electromagnetic signal is a valid signal transmitted from at least one external electronic device or is invalid data caused by an environmental noise component in an environment where there is no external electronic device around, wherein to determine whether the electromagnetic signal is a valid signal from the at least one external electronic device, the EM sensor module is configured to:
acquire at least two normalized data by applying at least two corresponding normalization function to electromagnetic detection data;
compare the at least two normalized data with corresponding threshold values; and
determine whether the electromagnetic signal is a valid signal from the at least one external electronic device based on a result of the comparison of the at least two normalized data with corresponding threshold values, and
based on the electromagnetic signal being a valid signal:
transmit the electromagnetic detection data related to all or at least part of the electromagnetic signal to a server,
receive an identification result on the electromagnetic signal from the server, and
provide the processor with the identification result on the electromagnetic signal.

* * * * *